Jan. 2, 1962     G. W. QUAST     3,015,396
APPARATUS FOR FLOTATION OF SUSPENDED MATERIAL
Filed Dec. 3, 1959
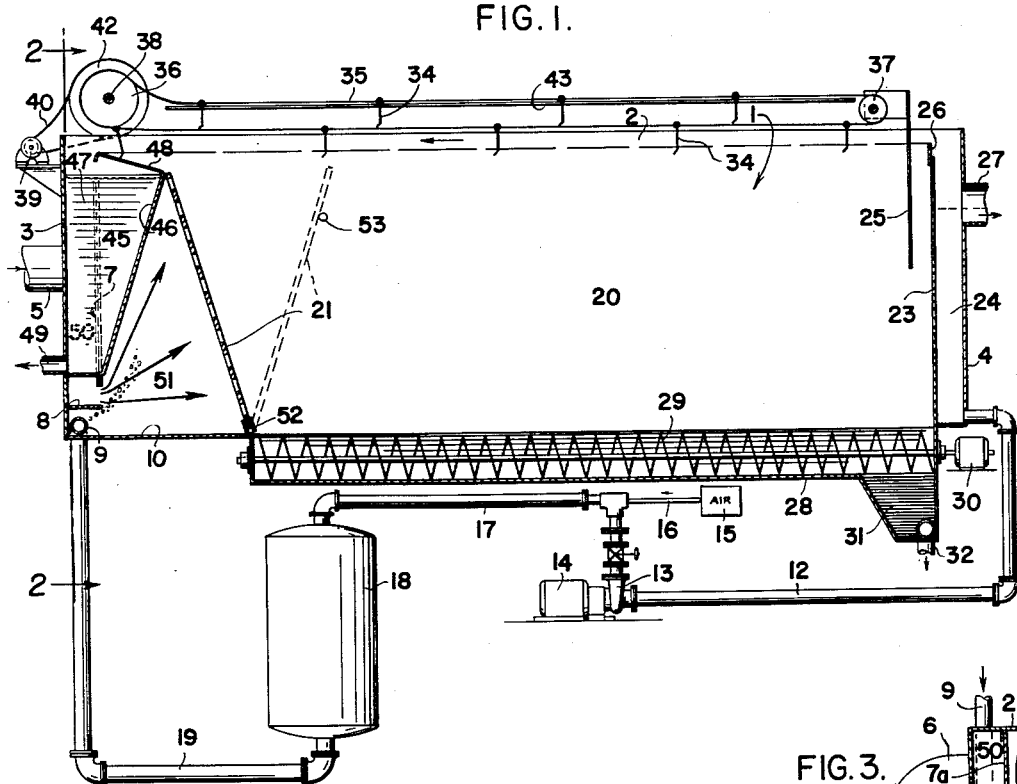
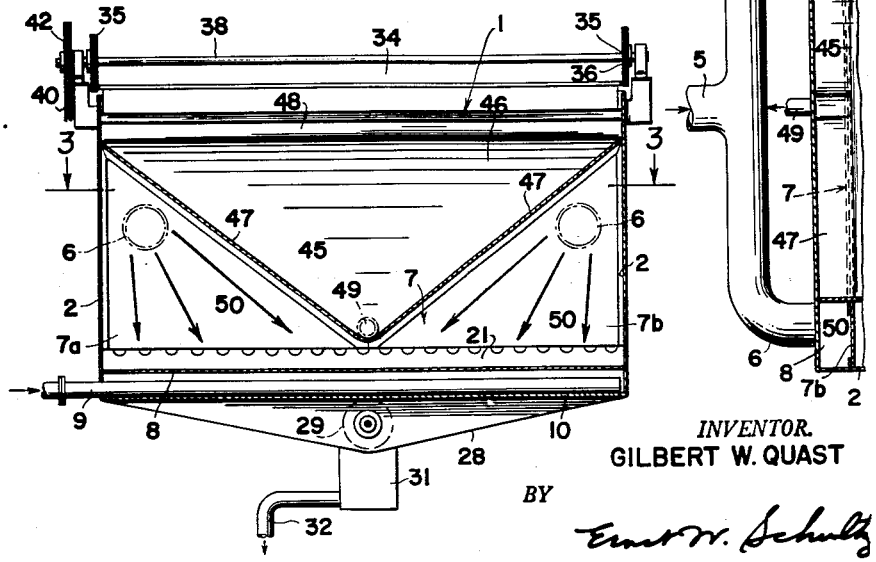
INVENTOR.
GILBERT W. QUAST
BY
Ernst W. Schultz
ATTORNEY

United States Patent Office 3,015,396
Patented Jan. 2, 1962

3,015,396
APPARATUS FOR FLOTATION OF SUSPENDED MATERIAL
Gilbert W. Quast, Brookfield, Wis., assignor to Chain Belt Company, Milwaukee, Wis., a corporation of Wisconsin
Filed Dec. 3, 1959, Ser. No. 857,061
8 Claims. (Cl. 210—221)

This invention relates to the clarification of liquids carrying suspended matter, such as sewage, industrial wastes and the like, and particularly to apparatus of the type shown and described in the application of Arthur C. Lind and William J. Katz Ser. No. 569,715 and filed March 6, 1956 for Liquid Clarification and Apparatus, now Patent No. 2,920,763 granted January 12, 1960.

In the apparatus referred to, a relatively clear liquid carrying the air in the form of finely-divided bubbles is separately introduced into the tank through a header disposed beneath a horizontal baffle extending the width of the tank. The liquid to be clarified enters the tank and is distributed to flow over the baffle so that the air readily contacts and adheres to the suspended matter. The entire flow then passes through a vertical, perforate plate which effects the distribution of the flow over the entire cross-section of the tank. The trough for collection of the floating matter is separately provided for at the effluent end of the tank.

The present invention is directed to the construction of the tank and particularly provides a unitary compact structure at the forward end of the tank having complementary, upper and lower sections. The upper section comprises the trough to receive the collected matter and the lower section is divided by a vertical baffle to form a downward passage having a cross-section which enlarges to the full width of the tank and a generally upward passage which enlarges vertically to the height of the perforate plate. In the downward passage the flow is spread the width of the tank to flow uniformly over the baffle referred to. In the mixing passage flow is spread vertically so that the suspended matter and air are well distributed over the entire area of the perforate plate upon reaching the same.

As in the apparatus referred to, the perforate plate isolates the mixing from the separation zones of the tank. However, the improved distribution of the flow before reaching the perforate plate allows the use of a plate with larger ports with less head loss across the ports and ports of a size that are less subject to clogging.

A principal object of the invention is to provide a compact, efficient and readily formed structure for receiving the solids and a distribution chamber having the desired expanding cross-section to provide the uniform distribution of the flow combined with the air-charged liquid over the entire cross section of the tank.

Another object of the invention is to reduce the necessary length of the tank, and to provide a tank which is easily serviced and cleaned and allows easy access to all parts thereof for cleaning and maintenance.

Another object of the invention is to provide for the efficient, dependable and uniform distribution of the raw liquid both horizontally and vertically for the efficient operation of the tank.

The drawings furnished herewith illustrate the best mode of carrying out the invention as presently contemplated and set forth hereinafter.

In the drawings:
FIGURE 1 is a vertical, longitudinal cross-section of the tank with the operating parts shown diagrammatically and the apparatus for the introduction of the air to the incoming raw liquid shown in side elevation.

FIG. 2 is a vertical cross-section taken on line 2—2 of FIG. 1; and
FIG. 3 is a horizontal section taken on line 3—3 of FIG. 2 and showing the influent end of the tank only.

The tank 1 shown in the drawings includes the side walls 2 and the end walls 3 and 4. The liquid to be clarified is delivered to the influent section of the tank by the pipe 5 which is connected to end wall 3 by the two branches 6. The vertical baffle 7 comprising members 7a and 7b are spaced from end wall 3 to direct the flow downwardly to pass over the horizontal baffle 8 extending across the tank and from wall 3 to below members 7a and b.

The relatively clear liquid carrying the air for flotation is introduced into the tank by the header 9 extending across the tank and below baffle 8 near the floor 10 of the influent section of the tank. The clear liquid may be obtained from any suitable supply including the effluent of tank 1 which, as shown, is delivered by the pipe 12 to the pump 13 driven by the motor 14.

A supply of air under pressure from the compressor 15, shown diagrammatically, is injected by line 16 into the pipe 17 connecting the discharge end of pump 13 with the top of the detention tank 18. The liquid with dissolved air under pressure is delivered to header 9 through the pipe 19 connecting the lower, outlet end of tank 18 with the end of the header extending through one side wall 2 of tank 1. As the liquid leaves header 9 and is restored to atmospheric pressure, a fraction of the dissolved air returns to the gaseous state in the form of very small bubbles.

The flow over baffle 8 is combined with the flow from header 9 allowing the air bubbles to contact and adhere to the suspended matter, and the combined flow enters the separation zone 20 of the tank through the perforate plate 21.

Zone 20 of the tank extends from perforate plate 21 to the inner tank wall 23 which is spaced from end wall 4 to form the well 24 therebetween. The clarified liquid leaves zone 20 from below the baffle 25 spaced from wall 23 and flows upwardly therebetween and over the weir plate 26 carried by wall 23. The flow over weir plate 26 falls into well 24 and leaves the well through the discharge pipe 27 connected to end wall 4 of the tank. The pipe 12 for the supply of clear liquid to the pump 13 as described may be connected to the tank to communicate with the lower end of well 24 as shown.

The bottom 28 of tank 1 between plate 21 and wall 23 slopes downwardly from side walls 2 of the tank to allow the solids settling out of the flow in zone 20 to be collected by the conveyor screw 29 extending lengthwise of the tank and having one end projecting from the tank and connected to the motor 30 for periodic operation as required. The slope of bottom 28 should be whatever may be required depending upon the nature of the solids settling out of the flow. The settled solids are collected by screw 29 in the sump 31 at one end of the tank for withdrawal through the pipe 32 connected thereto. Where no heavy solids are carried in the flow, tank 1 may be fitted with a plain flat bottom, not shown.

The flotation of the suspended solids from the liquid is effected in zone 20 by the finely divided air bubbles entrained in the flow entering zone 20 through baffle plate 21. The floating material forms a scum blanket at the liquid level determined and maintained by weir plate 26 and is collected by the flights 34 operating over the parallel chains 35 operating over the sprockets 36 and 37.

Sprockets 36 fixed on the shaft 38 at the influent end of tank 1 are driven by the motor 39 through chain 40 operating over the motor drive sprocket and the driven sprocket 42 fixed on shaft 38. Flights 34 are pivotally suspended between chains 35 so that they hang downwardly from the lower run of the chains and into the scum blanket to push the upper part of the blanket toward and up the beach 48. The return runs of chain 35 are supported by the elevated guides 43 to carry the flights 34 clear of the lower run. The sprockets 37 are rotatably and separately mounted to allow flights 34 free movement downwardly into the scum blanket at the effluent end of tank 1 just ahead of baffle 25.

The trough 45 for receiving and collecting the scum from beach 48 comprises the end wall 3 of tank 1, the inclined, triangular forward wall 46 and the bottom members 47 which support wall 46 from the end wall 3 of the tank. The upper end of wall 46 is joined to the forward edge of beach 48 below the liquid level in the tank and members 47 slope downwardly from side walls 2 of the tank toward the withdrawal pipe 49 communicating through an opening in wall 3 with the lowermost portion of the trough. The scum scraped up and over beach 48 by flights 34 enters the trough and flows downwardly toward the withdrawal pipe 49 for continuous or periodic removal as required.

According to the invention, scum trough 45 and the influent distribution passages comprise a compact separate section of the tank with the passages fitted together so that the lower dimensions of the scum trough define the complementary upper dimensions of the distribution passages.

Branches 6 connecting delivery pipe 5 to tank 1 open into the small upper ends of the passages 50 formed beneath trough 45 of the tank defined by end wall 3 and baffle 7 and by side walls 2 and the bottom members 47 of the tank and trough, respectively.

The space between baffles 7 and 8 forms the opening for the larger, merged lower ends of passages 50 providing the discharge of the liquid to be clarified into the mixing passage 51. The expansion of the flow in passages 50 reduces the velocity of the flow so that substantially uniform flow conditions obtain throughout the width of the tank, particularly upon entering mixing passage 51.

A moderate amount of turbulence in mixing passage 51 is necessary to effect the mixing of liquid from passages 50 and from header 9. The mixing action is uniform across the tank and starts at baffle 8 and includes an upward movement which is due to the entrained air. Baffle 7 and the front plate 46 of trough 45 with the floor 10, form the boundaries of the flow from above and below baffle 8 and provide the vertical expansion of the flow in passage 51. Plate 21 is inclined so that the upper part of the plate is not more than twice the distance to the lower part of the plate. This ratio is expressed only as an approximation and contemplates the use of a flat baffle plate 21 for practical reasons. In any case, the uppermost and lowermost parts of the plate define the larger outlet end of mixing passage 51 extending generally from baffle 8. The greater distance from baffle 8 to the upper part of the outlet end referred to is desired because of the upward movement of the flow due to entrained air.

Limited amounts of entrained air generally escape and rise directly to the upper part of the mixing passage. The escape of such air is allowed either through the uppermost ports in plate 21 or between the plate and the forward edge of beach 42 where it is joined to well 46 of trough 45. The weight of plate 21 holds its upper edge against the forward edge of beach 42 and the plate is pivotally supported along its lower edge as at 52 to allow the plate to be pivoted forwardly in the tank to rest against the abutment 53 carried by each wall 2 within the tank and to support the plate in the forward position shown in dotted lines in the drawing.

In the forward position referred to, access to mixing passage 51 is allowed for maintenance and cleaning of the tank, including the front side of plate 21.

Members 7a and 7b comprising baffle 7 are separately secured by suitable means, not shown, to allow their removal for easy access to the parts of the tank directly beneath trough 45. Passages 50 and 51 fit beneath scum trough 45 whereby their complementary arrangement provides a compact and inexpensive forward tank section having excellent hydraulic characteristics providing the efficient utilization of the air for flotation.

Various modes of carrying out the invention are contemplated as within the scope of the following claims particularly pointing out and distinctly claiming the subject matter which is regarded as the invention.

I claim:

1. In a tank having a forward zone for receiving a liquid carrying suspended solids and having a quiescent zone for the separation of the material from the liquid by flotation, an inclined plate forming a beach at the liquid level of the tank and a perforate plate extending from the lower edge of the beach to the bottom of the tank, said beach being disposed to receive the floating material pushed toward the forward zone of the tank and with said perforate plate separating the quiescent zone from the forward end of the tank, a series of flights operable over the quiescent zone of the tank to move the floating material up and over the beach, wall means in said forward zone dividing the same into upper and lower sections, the upper section comprising a trough beneath said beach to receive such material, an outlet for withdrawing the material from the lowermost part of the trough, said wall means having a steep slope downwardly from the sides of the tank and from the lower edge of said beach and converging just below said outlet, a delivery pipe communicating with the forward zone of the tank immediately beneath said wall means at the shallow end of the trough and above said outlet, a baffle extending downwardly from said wall means and having a lower edge extending across the tank and spaced from the bottom of the tank to divide said lower section into a downward passage from said pipe and a generally upward passage to said perforate plate, said downward passage having a progressively enlarging cross-section laterally of the tank and said generally upward passage having a progressively enlarging cross-section in the vertical direction whereby the flow from the delivery pipe is distributed over the entire area of the perforate plate before passing therethrough and into the quiescent zone of the tank.

2. In a tank having a forward end and a forward zone for receiving a liquid suspension and a quiescent zone for the separation of the suspended material from the liquid by flotation, means separating said zones comprising an inclined plate forming a beach at the liquid level of the tank with the upper edge of the plate near and generally parallel to the forward end of the tank and a perforate plate extending from the lower edge of the beach to the bottom of the tank, a series of flights operable at the liquid level of the tank to move the floating material up and over the beach, wall means in said forward zone dividing the same into upper and lower sections, the upper section comprising a trough beneath the upper edge of said beach to receive such material, said tank having an outlet for withdrawing the material from the lowermost part of the trough, said wall means having a steep slope downwardly from the sides of the tank and from the lower edge of said beach and converging just below said outlet, a delivery pipe having a connection to the forward end of the tank and located immediately beneath said wall means at the shallow end of the trough and above said outlet, a baffle extending downwardly from said wall means and having a lower edge extending across the tank and spaced from the bottom of the tank to divide said lower section into a downward passage from said pipe and a generally upward passage to said perforate plate, said downward passage having a progressively enlarging cross-section laterally of the tank and said generally upward passage having a progressively enlarging cross-section in the vertical direction whereby the flow from the delivery pipe is first distributed across the tank to pass under said baffle and is thereafter distributed vertically over the entire area of the perforate plate before passing therethrough and into the quiescent zone of the tank.

3. In a tank having a forward end wall and a bottom, apparatus for continuously mixing a liquid suspension and an air-charged liquid and introducing the same into the tank for the separation of the suspended material from the mixture by flotation, comprising a header extending across the bottom of the tank at the forward end wall for the introduction of the air-charged liquid, a horizontal baffle extending across the tank and from the forward end wall of the tank and over said header, an inclined plate forming a beach at the liquid level of the tank with the upper edge of the plate adjacent the forward end wall of the tank and a perforate plate extending from the lower edge of the beach to the bottom of the tank and dividing the tank to form a small forward section at said forward end wall with restricted communication between the forward section of the tank and the remaining larger quiescent zone of the tank, a series of flights operable over said quiescent zone at the liquid level of the tank to move the floating material up and over the beach, a trough in the forward section of the tank and beneath said beach to receive such material, said trough having a lower outlet for withdrawing the collected material and a bottom extending with a steep slope downwardly from the sides of the tank and from the lower edge of said beach and converging just below said outlet, a delivery pipe having a connection to the forward end of the tank and located immediately beneath a shallow end of the trough and above said outlet, a vertical baffle extending downwardly from said trough bottom and having a lower edge extending across the tank and spaced from said horizontal baffle, said vertical baffle being disposed between the forward end of the tank and said perforate plate to form a downward passage from said pipe and a generally upward passage to said perforate plate, said downward passage having a progressively enlarging cross-section laterally of the tank and said generally upward passage having a progressively enlarging cross-section in the vertical direction whereby the flow from the delivery pipe is first distributed across the tank to pass over said horizontal baffle and is thereafter distributed vertically with the air-charged liquid over the entire area of the perforate plate for introduction into the quiescent zone of the tank.

4. Apparatus including a tank defining a quiescent zone and a smaller separate forward section for continuously receiving and mixing a liquid suspension and an air-charged liquid and introducing the same into the quiescent zone of the tank for the separation of the suspended material from the mixture by flotation, said tank having a forward end and a bottom and said apparatus comprising distribution means extending across the bottom of the tank at the forward end thereof for the introduction of the air-charged liquid, an inclined plate forming a beach at the liquid level of the tank and a perforate plate extending from the lower edge of the beach to the bottom of the tank and providing restricted communication between the forward section of the tank and the larger quiescent zone of the tank, a series of flights operable over said quiescent zone at the liquid level of the tank to move the floating material up and over the beach, a trough in the forward section of the tank and beneath said beach to receive such material, said trough having a lower outlet for withdrawing the collected material and a bottom extending with a steep slope downwardly from the sides of the tank and from the lower edge of said beach and converging just below said outlet, a delivery pipe having a connection to the forward end of the tank and located immediately beneath a shallow end of the trough and above said outlet, a vertical baffle extending downwardly from said trough bottom and having a lower edge extending across the tank and spaced from said distribution means, said vertical baffle being disposed between the forward end of the tank and said perforate plate to form a downward passage from said pipe and a generally upward passage to said perforate plate, said downward passage having a progressively enlarging cross-section laterally of the tank and said generally upward passage having a progressively enlarging cross-section in the vertical direction whereby the flow from the delivery pipe is first distributed across the tank to pass over said distribution means and is thereafter distributed vertically with the air-charged liquid over the entire area of the perforate plate for introduction into the quiescent zone of the tank.

5. Apparatus including a tank defining a quiescent zone and a smaller separate forward section for continuously receiving and mixing a liquid suspension and an air-charged liquid and introducing the same into the quiescent zone of the tank for the separation of the suspended material from the mixture by flotation, said tank having a forward end and a bottom and said apparatus comprising distribution means extending across the bottom of the tank at the forward end thereof for the introduction of the air-charged liquid, an inclined plate forming a beach at the liquid level of the tank and a perforate plate extending from the lower edge of the beach to the bottom of the tank and providing restricted communication between the forward section of the tank and the larger quiescent zone of the tank, a series of flights operable over said quiescent zone at the liquid level of the tank to move the floating material up and over the beach, a trough in the forward section of the tank and beneath said beach to receive such material, said trough having a lower outlet for withdrawing the collected material and a bottom extending with a steep slope downwardly from the lower edge of said beach and toward the forward end of the tank, a delivery pipe having a connection to the forward end of the tank, a vertical baffle extending across the tank and connected to said trough bottom and having a lower edge extending across the tank and spaced from said distribution means, said vertical baffle being disposed between the forward end of the tank and said perforate plate to form a downward passage from said pipe and a generally upward passage to said perforate plate, whereby the flow from the delivery pipe is first distributed by said baffle across the tank to pass over said distribution means and is thereafter distributed vertically with the air-charged liquid over the entire area of the perforate plate for introduction into the quiescent zone of the tank.

6. Apparatus including a tank defining a quiescent zone and a smaller separate forward section for continuously receiving and mixing a liquid suspension and an air-charged liquid and introducing the same into the quiescent zone of the tank for the separation of the suspended material from the mixture by flotation, said tank having a forward end and a bottom and said apparatus comprising distribution means extending across the bottom of the tank at the forward end thereof for the introduction of the air-charged liquid, an inclined plate forming a beach at the liquid level of the tank and a perforate plate extending from the lower edge of the beach to the bottom of the tank and providing restricted communication between the forward section of the tank and the larger quiescent zone of the tank, a series of flights operable over said quiescent zone at the liquid level of the tank to move the floating material up and over the beach, a trough in the forward section of the tank and beneath said beach to receive such material, said trough having a lower outlet for withdrawing the collected material and a bottom extending with a steep slope downwardly from at least one side of the tank and from the lower edge of said beach and converging just below said outlet, a delivery pipe having a connection to the forward end of the tank and located immediately beneath a shallow end of the trough and above said outlet, a vertical baffle extending downwardly from said trough bottom and having a lower edge extending across the tank and spaced from said distribution means, said vertical baffle being disposed between the forward end of the tank and said perforate plate to form a downward passage from said pipe and a generally upward passage to said perforate plate, said downward passage having a progressively enlarging cross-section laterally of the tank and said generally upward passage having a progressively enlarging cross-section in the vertical direction whereby the flow from the delivery pipe is first distributed across the tank to pass over said distribution means and is thereafter distributed vertically with the air charged liquid over the entire area of the perforate plate for introduction into the quiescent zone of the tank.

7. Apparatus including a tank defining a quiescent zone and a smaller separate forward section for continuously receiving and mixing two liquids and introducing the same into the quiescent zone of the tank for the separation of the suspended material from the mixture by flotation, said tank having a forward end and a bottom and said apparatus comprising distribution means extending across the bottom of the tank at the forward end thereof for the introduction of the first liquid, an inclined plate forming a beach at the liquid level of the tank and over said distribution means, a perforate plate extending from the lower edge of the beach to the bottom of the tank and providing restricted communication between the forward section of the tank and the larger quiescent zone of the tank, a series of flights operable over said quiescent zone at the liquid level of the tank to move the floating material up and over the beach, a trough in the forward section of the tank and beneath said beach to receive such material, said trough having a lower outlet for withdrawing the collected material and a bottom extending with a steep slope downwardly from the lower edge of said beach and toward the forward end of the tank, a delivery pipe for the second liquid and having a connection to the forward end of the tank, a vertical baffle extending across the tank and connected to said trough bottom and having a lower edge extending across the tank and spaced from said distribution means, said vertical baffle being disposed between the forward end of the tank and said perforate plate to form a downward passage from said pipe and a generally upward passage to said perforate plate, whereby the flow from the delivery pipe is first distributed by said baffle across the tank to pass over said distribution means and is thereafter distributed vertically with the first liquid over the entire area of the perforate plate for introduction into the quiescent zone of the tank.

8. The invention of claim 5 wherein the perforate plate is pivotally supported at its lower end to allow the upper end to be moved forwardly in the tank away from the beach, and means are provided for temporarily securing the perforate plate in an inclined forward position for acess to the perforate plate and said passages.

References Cited in the file of this patent

UNITED STATES PATENTS

| | | |
|---|---|---|
| 2,813,074 | Banks et al. | Nov. 12, 1957 |
| 2,920,763 | Lind et al. | Jan. 12, 1960 |

FOREIGN PATENTS

| | | |
|---|---|---|
| 1,038,610 | France | May 13, 1953 |